United States Patent [19]

Iwashita et al.

[11] Patent Number: 5,726,545
[45] Date of Patent: Mar. 10, 1998

[54] CURRENT CONTROLLING METHOD FOR SERVO MOTOR

[75] Inventors: Yasusuke Iwashita; Hiroyuki Kawamura, both of Yamanashi, Japan

[73] Assignee: Fanuc Ltd., Yamanashi, Japan

[21] Appl. No.: 671,875

[22] Filed: Jun. 28, 1996

[30] Foreign Application Priority Data

Jun. 30, 1995 [JP] Japan ................................. 7-186703

[51] Int. Cl.⁶ ...................................................... H02P 7/36
[52] U.S. Cl. ............................ 318/432; 318/599; 318/606; 318/632; 318/809
[58] Field of Search ....................... 318/432, 438, 318/560, 599, 600, 606, 608, 615, 619, 632, 633, 635, 807, 812, 809

[56] References Cited

U.S. PATENT DOCUMENTS 4,540,925  9/1985  Jones .
5,361,210  11/1994  Fu .

*Primary Examiner*—Bentsu Ro
*Attorney, Agent, or Firm*—Staas & Halsey

[57] ABSTRACT

A current control method for a servo motor capable of compensating a delay in a current loop. A corrective electrical angle corresponding to the delay in the current loop is obtained and a phase angle is corrected using the corrective electrical angle. Then the delay of the current loop is compensated by a DQ coordinate conversion for converting a three-phase AC current into a two-phase DC current, or a two-phase DC voltage into a three-phase AC voltage, using the corrected phase angle. The phase angle is corrected by subtracting the corrective electrical angle from the phase angle and the DQ conversion is performed for obtaining a two-phase DC current from a three-phase AC current using the corrected phase angle. Alternatively, the phase angle is corrected by adding the corrective electrical angle to the phase angle and the DQ conversion is performed for obtaining a three-phase AC voltage from a two-phase AC voltage using the corrected phase angle, to compensate the delay of the current loop.

4 Claims, 15 Drawing Sheets

6000 r.p.m. (WITHOUT PHASE ADVANCE)

6000 r.p.m. (PHASE COMPENSATION)

(RANGE OF HORIZONTAL AXIS IS MODIFIED)

CURRENT CONTROLLING METHOD FOR SERVO MOTOR

BACKGROUND OF THE INVENTION

1. Field of the Invention

The present invention relates to a current controlling method for a servo motor, and more particularly to a method of controlling an electric current to be supplied to a servo motor using a DQ conversion.

2. Description of the Related Art

FIG. 15 shows a conventional control system for an AC servo motor. In FIG. 15, a position deviation is obtained by subtracting a position feedback value, which is detected by an encoder, from a position command outputted from a non-illustrated numeral control unit. A velocity command is obtained by a position loop in which the position deviation is multiplied by a position gain, and a velocity deviation is obtained by subtracting a velocity feedback value from the velocity command. A velocity loop process including a proportional control and an integral control is performed based on the velocity deviation to obtain a torque command (current command). Further, a current deviation of each phase is obtained by subtracting a current feedback value from the torque command, and a current loop process is performed based on the current deviation to obtain a voltage command for each phase. Based on the voltage command, PWM control is performed to control the current of the AC servo motor M.

In the above control system, it is known to control three-phases currents individually in a current loop in the case of using a three-phase AC servo motor. In this current control method, the torque command (current command) obtained by the velocity loop control is multiplied by sine waves, each deviated by an electrical angle of 2π/3 with respect to the servo motor's rotor position θ detected by the encoder, for the respective phases U, V and W, to obtain a current command for each phase. Then, a current deviation is obtained by subtracting an actual current Iu, Iv, Iw of each phase, which is detected by the respective current detector, from the respective current command. A proportional and integral (PI) control is performed for each phase to output the command voltage Eu, Ev, Ew for the respective phase to a power amplifier. A PWM control is performed by an inverter of the power amplifier to supply the current Iu, Iv, Iw for the respective phase of the servo motor M. Thus, a current loop is formed as an innermost minor loop of the position and velocity loops to control a current supplied to each phase of the AC servo motor M.

In the case where the current of three phases are individually controlled, there exists a deviation such as a phase delay with respect to the command and an attenuation of amplitude due to the frequency characteristic of the current loop, even under a normal condition during constant-speed rotation with a constant load so that the same torque control as that of a DC motor is difficult to realize. As a solution to this problem, it is known a DQ control method in which the three-phases current is converted into a direct current coordinate system of two phases of d and q by a DQ conversion and then each phase is controlled as a direct current component.

FIG. 16 is a block diagram of a control system in which an AC servo motor is controlled by the DQ conversion. A current command of the phase d is made "0", and a current command of the phase q is set to a torque command outputted from the velocity loop. A convertor 9 for converting a three-phase current into a two-phase current obtains current Id for the phase d and current Iq for the phase q, using an actual current of each phase u, v and w of the motor and the rotor phase θ detected by a rotor position detector. The obtained currents are subtracted from command values for the respective phases to obtain current deviations of the phases d and q. In current controllers 5d and 5q, an command voltage Vd of the phase d and an command voltage Vq of the phase q are obtained by proportional and integral control based on the current deviations. A converter 8 for converting a two-phase voltage into a three-phase voltage obtains command voltages Vu, Vv and Vw of phases C, V and W from the command voltages Vd and Vq of the two phases and outputs these command voltages to a power amplifier 6, in which an invertor supplies currents Iu, Iv and Iw to the respective phases of the servo motor to control the servo motor.

In the conventional DQ conversion, the conversions from three phase to two phase and from two phase to three phase are performed at the same phase and the current is controlled under a condition that the power factor always equals to 1. In this current controlling method, there is a problem that the control of the servo motor is unstable due to the delay of the current loop. As the current control is performed based on sampling in the current loop including the DQ conversion, a time delay occurs by (i) the period from the time when the voltage command (PWM command) is outputted to the time when actually the voltage is effectively reflected on the winding of the motor, and (ii) the period from the time when the current actually flows to the time when the actual current is read by servo software via an analog-to-digital converter. This time delay is included in the control system as a delay of the current loop. As the delay of the detection system in the current loop enters the control system, the current loop is made unstable to cause an undesirable phenomenon such as oscillation. FIG. 17 shows a state in which the detected actual current oscillates clue to the unstable control system. The oscillation phenomenon occurs from the vicinity of a position A. This delay of the current loop will become larger when the rotational speed of the servo motor becomes higher to increase the electrical angular velocity. As a result, the maximum rotational speed of the AC servo motor is restricted in view of stableness of control.

SUMMARY OF THE INVENTION

It is an object of the present invention to provide a current controlling method for a servo motor, which is capable of compensating a delay in a current loop.

A current controlling method for a servo motor of the present invention comprises the steps of: obtaining a phase angle of the rotor; obtaining a corrective electrical angle corresponding to a phase delay occurred in the current loop; correcting the phase angle based on the corrective electrical angle; obtaining a command voltage by performing a DQ conversion using the corrected phase angle; and controlling the current to be supplied to the servo motor based on the obtained command voltage. In the current controlling method of the present invention, the DQ control method is adopted in which a three-phase current is converted into components on a two-phase current coordinate system of the phases d and q, and the respective phases are controlled as the direct current components. The delay of the current loop occurred due to that sampling is compensated by correcting a phase angle to be used in the DQ conversion for converging the three-phase coordinate system into a DQ coordinate system, or the DQ coordinate system into the three-phase coordinate system. A corrective electrical angle for correcting the phase angle can be obtained by the product of a delay time of the current loop and an electrical angular velocity.

In converting the three-phase current into the two-phase current and the two-phase voltage into the three-phase voltage, the DQ conversion is performed using the phase angle. In the current control method of this invention, the phase angle to be used in the DQ conversion is corrected by adding or subtracting the corrective electrical angle, to thereby compensate the delay of the current loop. In the coordinate conversion from the three-phase coordinate system into the DQ coordinate system for obtaining a two-phase current from a three-phase current, the phase angle is corrected by subtracting the corrective angle from the phase angle. In the coordinate conversion from the DQ coordinate system into the three-phase coordinate system for obtaining a three-phase voltage from a two-phase voltage, the phase angle is corrected by adding the corrective angle to the phase angle.

DETAILED DESCRIPTION OF THE PREFERRED EMBODIMENT

A first embodiment of the present invention will be described referring to FIGS. 4 and 5, in comparison with a comparative example of FIGS. 1–3 in which a phase angle is not corrected. In the first embodiment, a DQ coordinate conversion for obtaining a two-phase current from a three-phase current is performed using a phase angle which is corrected by subtracting a correcting electrical angle from the phase angle, thus compensating the delay of a current loop.

Figure 1:
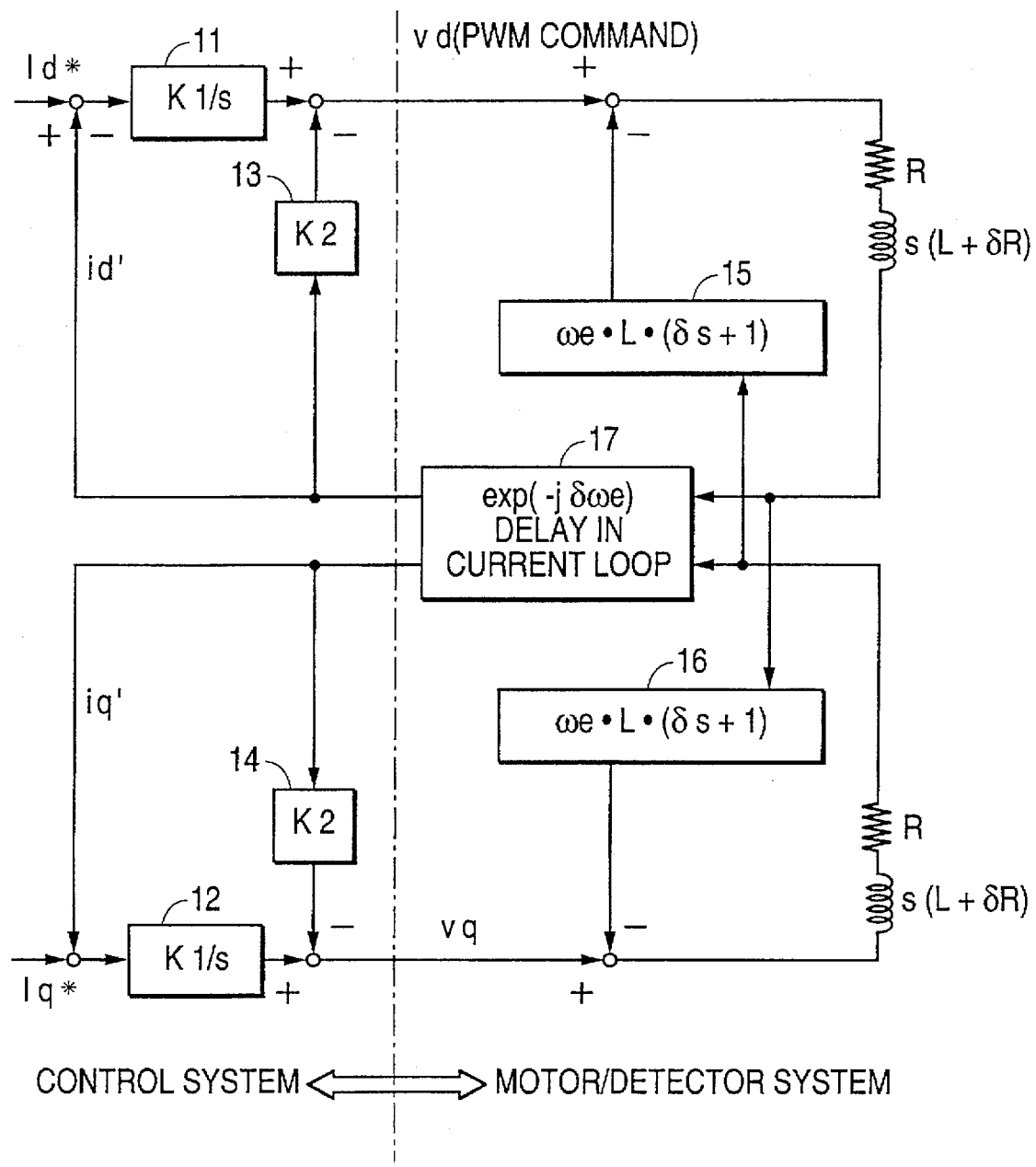
FIG. 1 is a block diagram of a current loop for controlling an AC servo motor using a DQ conversion.
Figure 2:
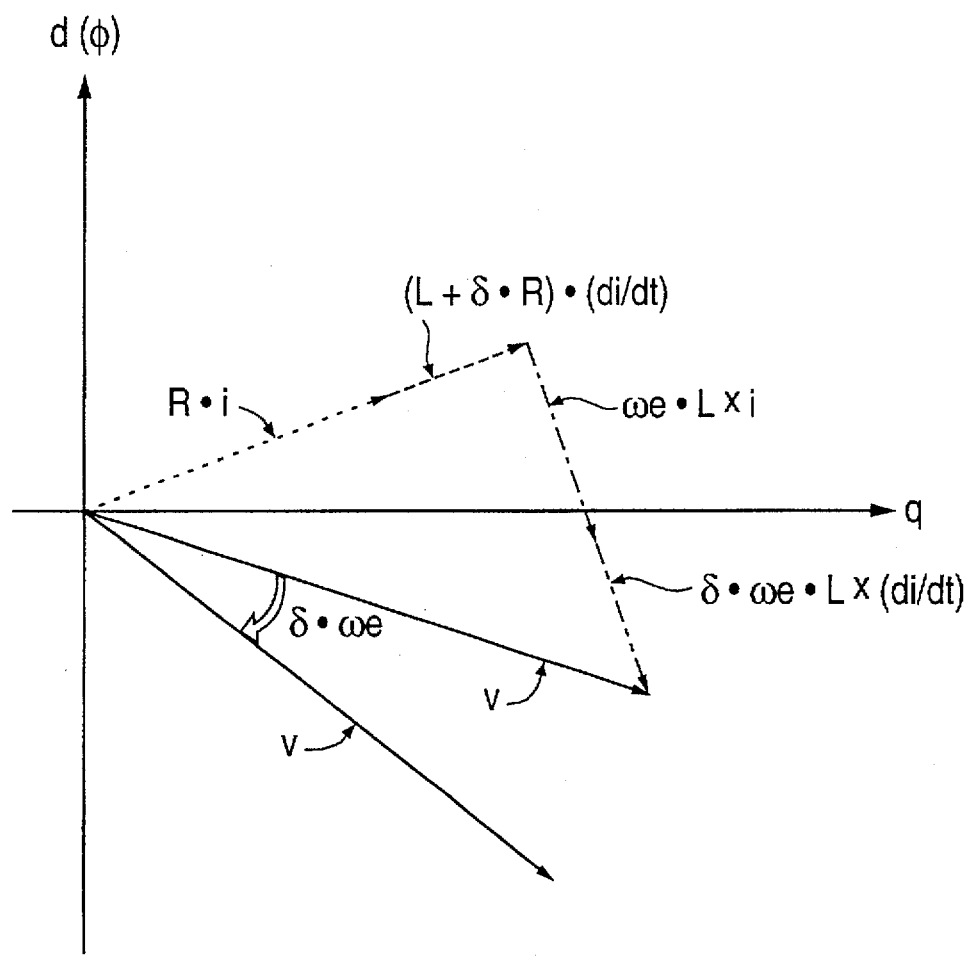
FIG. 2 is a vector diagram showing the state of phases of the AC servo motor.
Figure 3:
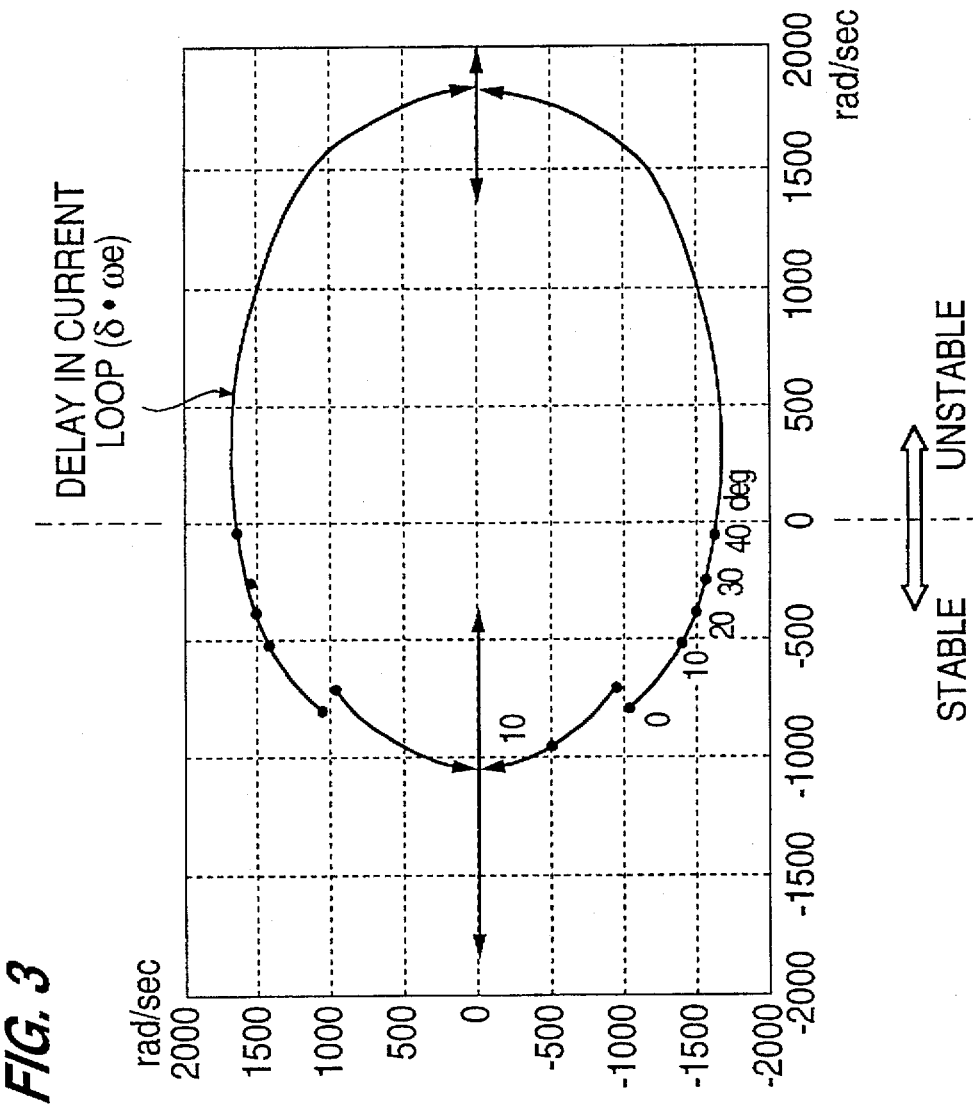
FIG. 3 is a graph showing the relationship between the delay of the current loop and the polar position of a control system.

First of all, a current loop as shown in FIGS. 1–3 in which the phase angle is not corrected will be described. A left half and a right half of FIG. 1 divided by a chain line respectively show a control system and a motor/detector system. For each of the phases d and q, the control system comprises integral terms 11 and 12 having an integral gain K1 and proportional terms 13 and 14 having a proportional gain K2, while the motor/detector system comprises a resistance component R and an inductance component L of the motor. Each phase d and q has an interference term 15 and 16, respectively representing interference from each other and a term 17 representing a delay of the current loop. In FIG. 1, the delay term 17 is shown in a block with a delay angle $\Delta\theta$ being represented by the product of a time delay $\delta$ and an electrical angular frequency $\omega e$, The delay term 17 delays the phase of a current value by the delay angle $\Delta\theta$, and output currents id' and iq' are fed back and subtracted from command currents id* and iq*, respectively. Thereby the delay of the detection system in the current loop enters the control system to deteriorate the stableness of the current loop.

FIG. 2 is a vector diagram showing a state of phases of an AC servo motor in the d-q coordinate system. In FIG. 2, a voltage v on a coil of the AC servo motor is represented by the sum of vectors (R·i), (L+$\delta$·R)·(di/dt) indicated in dotted lines, and vectors ($\omega e$·Lxi), ($\delta$·$\omega e$·L)×(di/dt) indicated in chain lines. Thus, the voltage v is expressed by the following equation (1).

$$v = (R \cdot i) + (L + \delta \cdot R) \cdot (di/dt) + (\omega e \cdot Lxi) + \delta \cdot \omega e \cdot Lx(di/dt) = \{(L + \delta \cdot R) \cdot (d/dt) + R\} \cdot i + \omega e \cdot L(\delta \cdot (d/dt) + 1) \cdot i \quad (1)$$

The phase delay represented by $\exp(-j \cdot \delta \cdot \omega e)$ in the delay term 17 causes the vector v to turn in a negative direction (clockwise) by $\Delta = \delta \cdot \omega e$ in FIG. 2. Thus, the resulting vector v' is expressed by the following equation (2).

$$v' = \exp(-j\delta \cdot \omega e) \cdot [\{(L+\delta \cdot R) \cdot (d/dt) + R\} \cdot i + \omega e \cdot L(\delta \cdot (d/dt) + 1) \cdot i] \quad (2)$$

The relationship between the delay of the current loop and the polar position of the control system is shown in FIG. 3. The locus in FIG. 3 represents a movement of the polar position according to the delay of the current loop. In FIG. 3, the left side of the chain line is a region in which the system is stable, and the right side of the chain line is a region in which the system is unstable. When the delay $\Delta\theta$ of the current loop increases, the polar position moves gradually from the stable region to the unstable region and when the delay $\Delta\theta$ of the current loop is about 40°, the polar position reaches a border of the stable and unstable regions.

Thus, the stableness of the current loop is deteriorated by the delay $\exp(-j \cdot \delta \cdot \omega e)$ of the current loop of the detection system entered into the control system. This delay of the current loop will be larger when the rotational speed of the servo motor becomes high to increase the electrical angular velocity.

Figure 4:
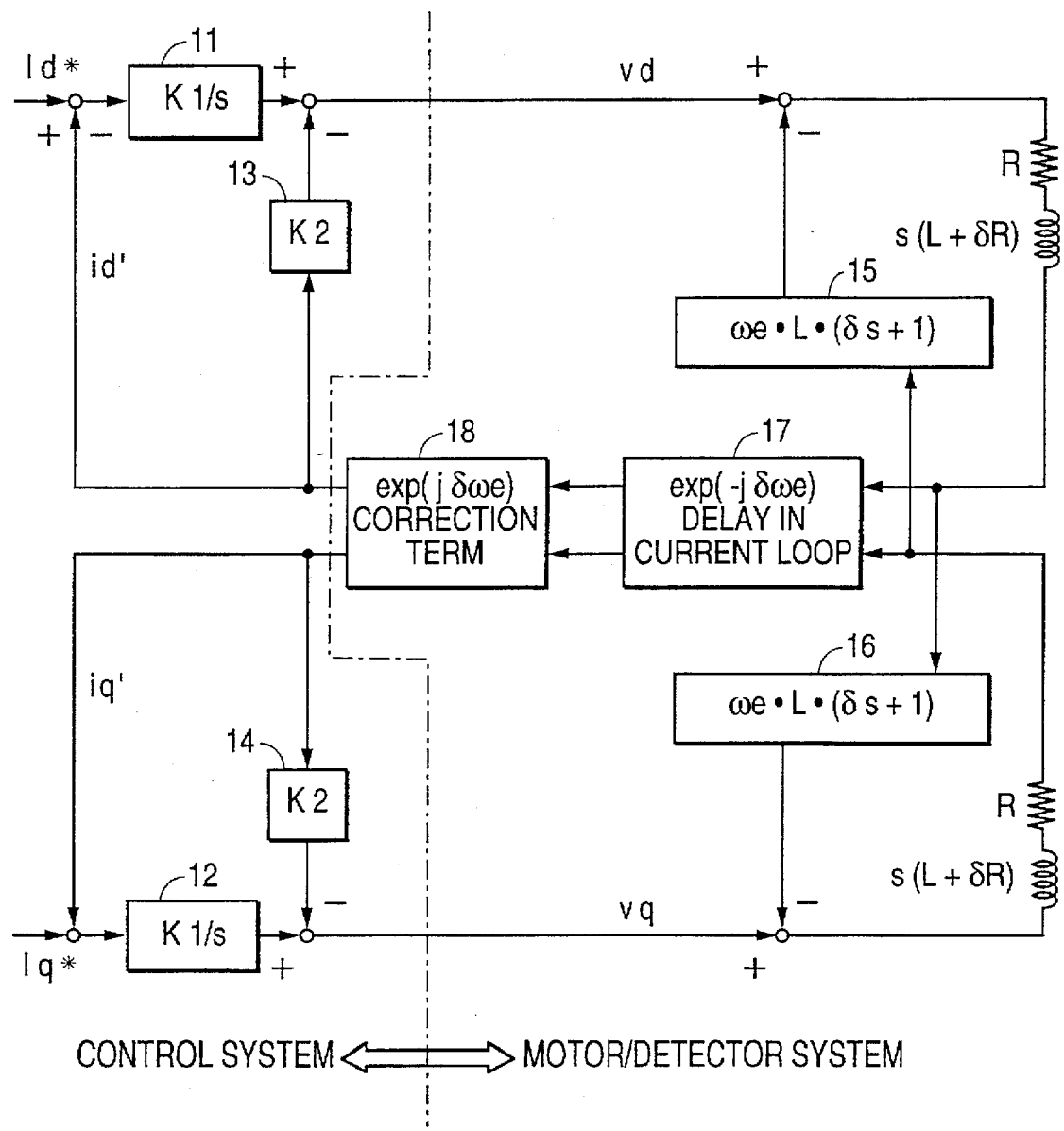
FIG. 4 is a block diagram of a current loop according to a first embodiment of the present invention.
Figure 5:
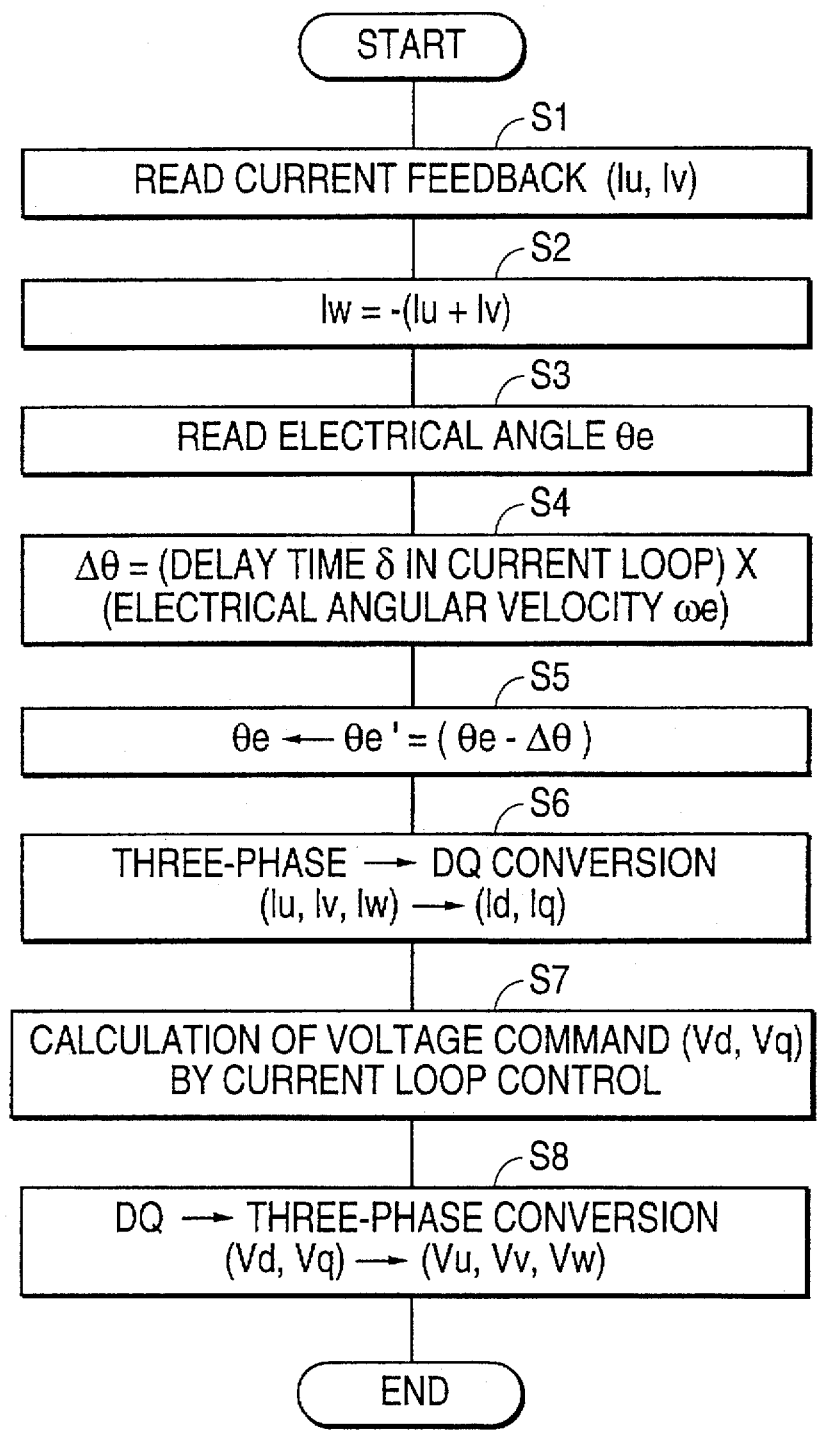
FIG. 5 is a flowchart of the current control according to the first embodiment.

In the block diagram shown in FIG. 4, a correction term 18 is connected to the delay term 17 of the current loop, compared with a block diagram shown in FIG. 1 according to a first embodiment of the present invention. A left half and a right half of FIG. 4 divided by the chain line respectively show a control system and a motor/detector system. For each of the phases d and q, the control system comprises integral terms 11 and 12 having an integral gain K1, and proportional terms 13 and 14 having a proportional gain K2, while the motor/detector system comprises a resistance component R and an inductance component L of the motor. Each phase d and q has an interference term 15 and 16, respectively representing interference from each other and a term 17 representing a delay of the current loop.

The correction term 18 makes the phase of the current advance by the same single $\Delta\theta$ as the delay angle, and output currents id' and iq' thereof are fed back and subtracted from command currents id* and id*, respectively. As a result, the current control is performed based on the phase angle $\Delta\theta$ which is obtained by correcting the delay angle $\Delta\theta$ of the current loop. The delay angle $\Delta\theta$ of the current loop can be obtained by the product of the time delay $\delta$ and the electrical angular frequency $\omega e$.

The DQ conversion proceeds in the first embodiment will be described referring to the flowchart of FIG. 5.

Figure 8:
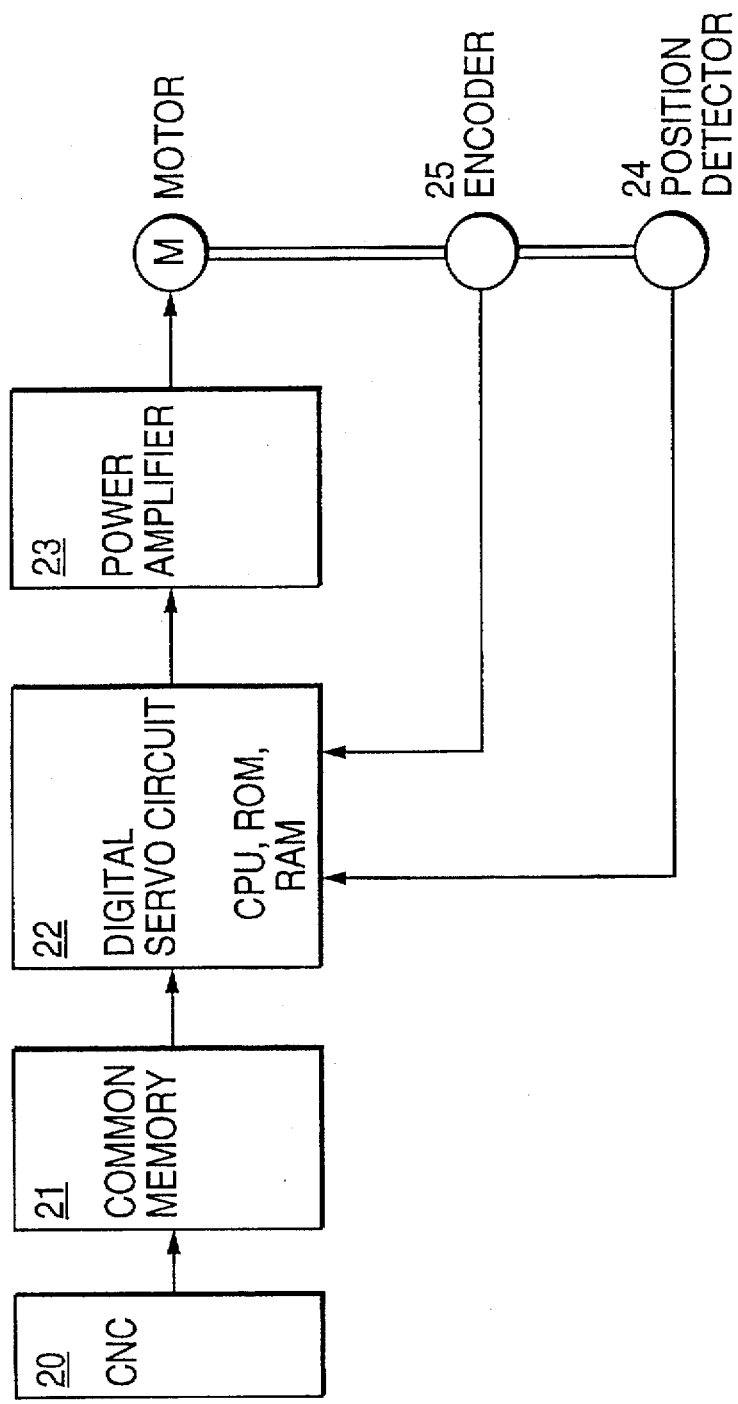
FIG. 8 is a block diagram showing a servo motor control system for carrying out the method of the present invention.

In the flowchart of FIG. 8, first, actual currents Iu and Iv of phases u and v of the servo motor are obtained by the current feedback (Step S1). Using the relationship Iu+Iv+Iw=0, the actual current Iw of the phase w is obtained by an arithmetic of Iw=-(Iu+Iv) (Step S2). Further, the phase angle $\Delta\theta$ of the rotor is obtained from an output of a rotor position detector (Step S3).

Then, an correcting electrical angle $\Delta\theta$ corresponding to the delay of the current loop of the servo motor is obtained. This correcting electrical angle $\Delta\theta$ can be obtained by the product of a delay time $\delta$ of the current loop and an electrical angular velocity $\omega e$ of the rotor. The delay time $\delta$ of the current loop comprises a period from the time when a voltage command (PWM command) is outputted to the time when the voltage is actually applied to the windings of the servo motor, and a period for detecting the actual current from the time when the current actually flows in the windings to the time when the current is read by servo software via an analog-to-digital converter. Since the delay time is a value inherent to the servo motor, it can be previously obtained as a characteristic value of the servo motor. On the other hand, the electrical angular velocity $\omega e$ of the rotor can be obtained from the output of the rotor position detector (Step S4).

Then, the corrective electrical angle $\Delta\theta$, which is obtained in Step S4, is subtracted from the rotor's phase angle $\Delta\theta$ obtained in Step S3, and subtracted value $\theta e'$ is substituted for the phase angle $\theta e$ to renew the phase angle (Step S5).

Then, a current Id for the phase d and a current Iq for the phase q are obtained by a DQ conversion for converting a three-phase AC current to a two-phase DC current, using the corrected phase angle $\theta e$, as shown in the following equation (3).

$$\binom{Id}{Iq} = \sqrt{2/3} \cdot \begin{pmatrix} \cos\theta e & \sin\theta e \\ -\sin\theta e & \cos\theta e \end{pmatrix} \cdot \begin{pmatrix} 1 & -1/2 & -1/2 \\ 0 & \sqrt{3/2} & -\sqrt{3/2} \end{pmatrix} \cdot \begin{pmatrix} Iu \\ Iv \\ Iw \end{pmatrix} \quad (3)$$

Since $\theta e$ used in the arithmetic of the equation (3) is the phase angle $\theta e$ corrected in Step S4, the delay component $\Delta\theta$ of the current loop is compensated (Step S6).

The corrected currents Id and Iq for the phases d and q are subtracted from the respective command values of the phases d and q, to obtain current deviations of the phases d and q. Based on these current deviations, the proportional and integral control is performed in the current controller to obtain an command voltage Vd of the phase d and an command voltage Vq of the phase q (Step S7). Further, in the converter for converting a two-phase voltage into a three-phase voltage, command voltages Vu, Vv and Vw of the phases U, V and W are obtained by a DQ conversion for converting a two-phase DC voltage into a three-phase AC voltage (Step S8), as expressed by the following equation (4). These command voltages are outputted to a power amplifier in which the invertors make the currents Iu, Iv and Iw flow in the respective phases of the servo motor, thereby controlling the servo motor.

$$\begin{pmatrix} Vu \\ Vv \\ Vw \end{pmatrix} = \sqrt{2/3} \cdot \begin{pmatrix} 1 & 0 \\ -1/2 & \sqrt{3/2} \\ -1/2 & -\sqrt{3/2} \end{pmatrix} \cdot \begin{pmatrix} \cos\theta e & -\sin\theta e \\ \sin\theta e & \cos\theta e \end{pmatrix} \cdot \begin{pmatrix} Vd \\ Vq \end{pmatrix} \quad (4)$$

A second embodiment of the present invention will be described referring to FIGS. 6 and 7. In the second embodiment, a coordinate conversion from the DQ coordinate system to the three-phase coordinate system is performed for obtaining a three-phase voltage based on the two-phase voltage, using the phase angle obtained by adding the corrective angle, to compensate the delay of the current loop.

Figure 6:
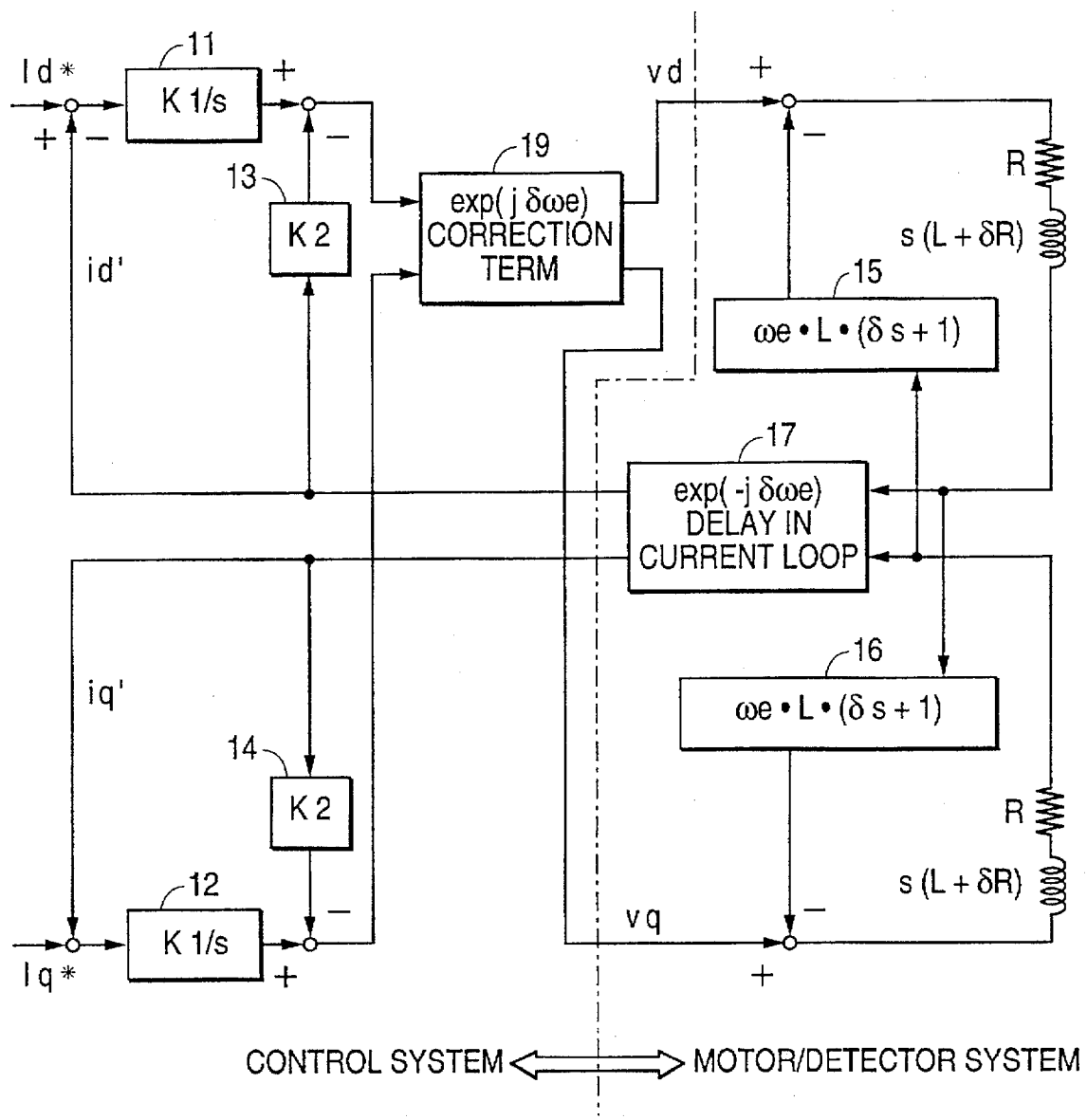
FIG. 6 is a block diagram of a current loop according to a second embodiment of the present invention.

In a block diagram as shown in FIG. 6, a correcting term 19 is connected between the integral terms 11, 12 and the motor side, compared with a block diagram shown in FIG. 1. All of the elements are identical with those of FIG. 1 except the correction term 19 and with those of FIG. 4 except the correction term 18, and therefore any repetitive description is omitted here.

The correction term 19 supplies the motor with voltage values Vd and Vq whose phases are advanced by the same angle $\Delta\theta$ as the delay angle $\Delta\theta$ of the current loop, thereby compensating the delay angle $\Delta\theta$ of the current loop. The delay angle $\Delta\theta$ of the current loop can be obtained by the product of the time delay $\delta$ and the electrical angular frequency $\omega e$ likewise the first embodiment.

Figure 7:
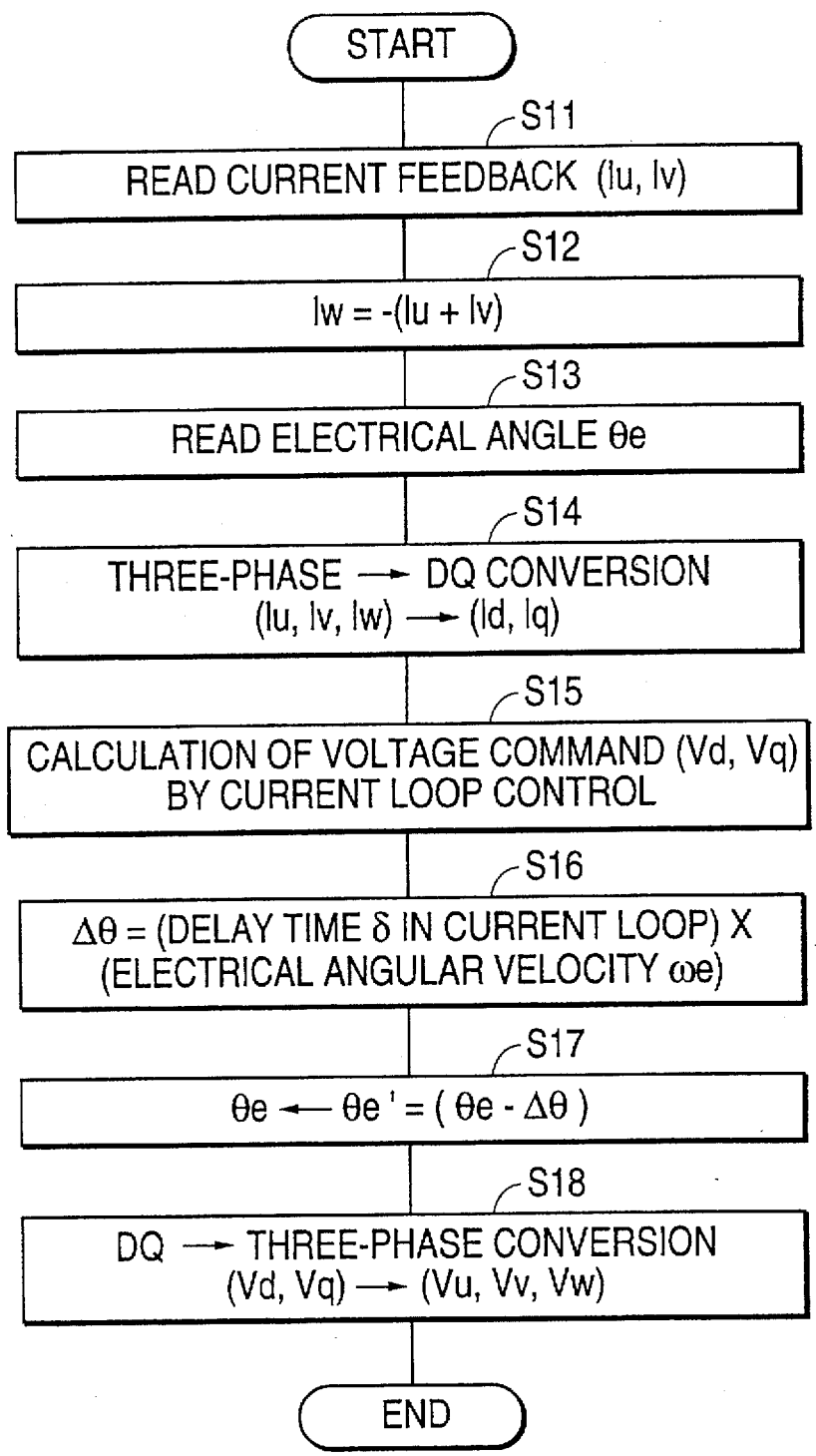
FIG. 7 is a flowchart of the current control according to the second embodiment.

In the flowchart of FIG. 7, actual currents Iu and Iv of the phases u and v of the servo motor are obtained by the current feedback likewise the Steps S1 through S3 in the first embodiment (Step S11). An actual current Iw of the phase w is obtained by arithmetic of Iw=-(Iu+Iv) (Step S12), and the phase angle $\theta e$ of the rotor is obtained (Step S13).

Then, a current d for the phase d and a current Id for the phase q are obtained from the actual current Iu, Iv and Iw by the DQ conversion for obtaining the two-phase DC current from the three-phase AC current, according to the equation (3) (Step S14). The electrical angle $\theta e$ which is obtained in Step S3 is used for $\theta e$ in the equation (3).

The obtained currents Id and Iq of the phases d and q are subtracted from the respective command values of the phases d and q to obtain current deviations of the phases d and q, and based on these current deviations the proportional and integral control is performed in the current controller to obtain command voltages Vd and Vq of the phases d and q (Step S15).

Then, a corrective electrical angle $\Delta\theta$ corresponding to the delay of the current loop of the servo motor is obtained. The corrective angle can be obtained by the project of the delay time $\delta$ of the current loop and the electrical angular velocity $\omega e$ likewise Step S4. The delay time $\delta$ and the electrical angular velocity $\omega e$ can be obtained likewise the Step S4 (Step S16).

Then, the corrective electrical angle $\Delta\theta$, which is obtained in Step S16, is added to the rotor's phase angle $\theta e$ obtained in Step S13, and the resultant value θe' is substituted for the phase angle θe to renew the phase angle (Step S17).

Further, in the converter for converting a two-phase voltage into a three-phase voltage, command voltages Vu, Vv and Vw of the phases U, V and W are obtained by the DQ conversion for converting a two-phase DC voltage into a three-phase AC voltage, as expressed by the equation (4), (Step S18), and these command voltages are outputted to the power amplifier in which the invertors make the currents Iu, Iv and Iw flow in the respective phases of the servo motor, thereby controlling the servo.

FIG. 8 is a block diagram showing a servo motor control system for carrying out the present invention. As this control system is identical in construction with a conventional apparatus for a digital servo control, a detailed description of the system is omitted here. In FIG. 8, a reference numeral 20 designates a computerized numerical control unit (CNC); 21, a common RAM; 22, a digital servo circuit having a processor (CPU), ROM, RAM. etc.; 23, a power amplifier such as a transistor inverter; M, an AC servo motor; 24, an encoder for generating pulses in response to rotation of the AC servo motor; and 25, a rotor position detector for detecting a phase of the rotor.

Figure 9:
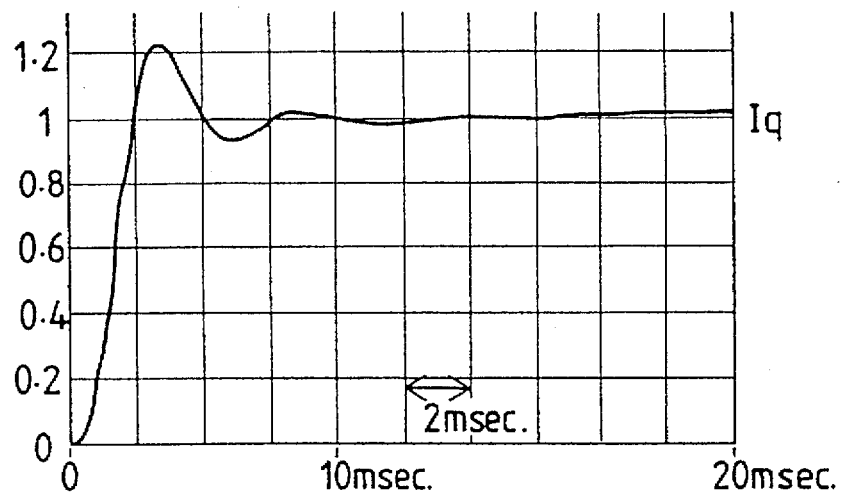
FIG. 9 is a graph showing a step response of the phase q when the servo motor is stopped.
Figure 10:
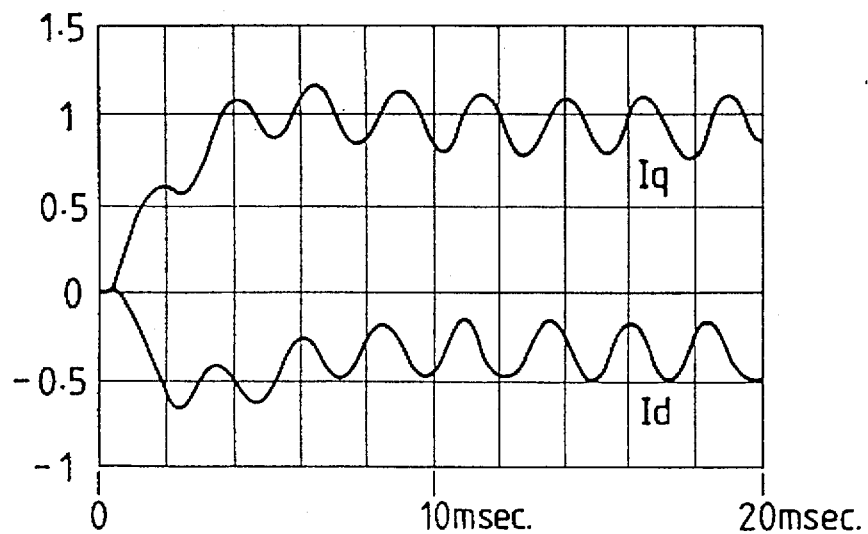
FIG. 10 is a graph showing a step response of the phase q when the compensation of the delay of the current loop is not performed an 4,000 rpm.
Figure 11:
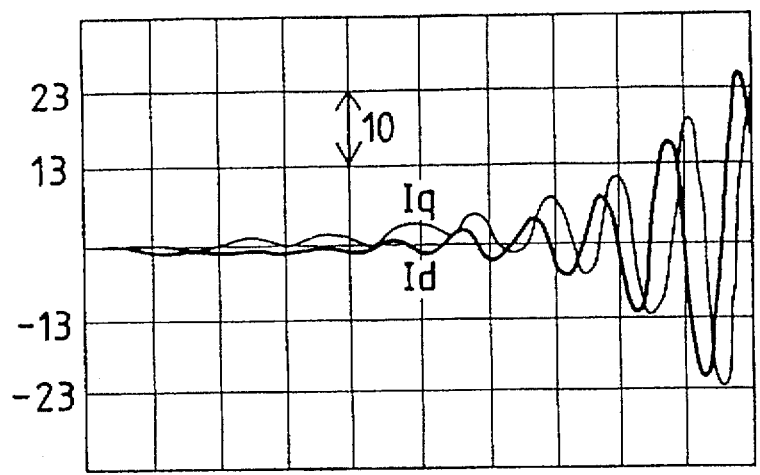
FIG. 11 is a graph showing a step response of the phase q when compensation of the delay of the current loop is not performed at 8,000 rpm.
Figure 12:
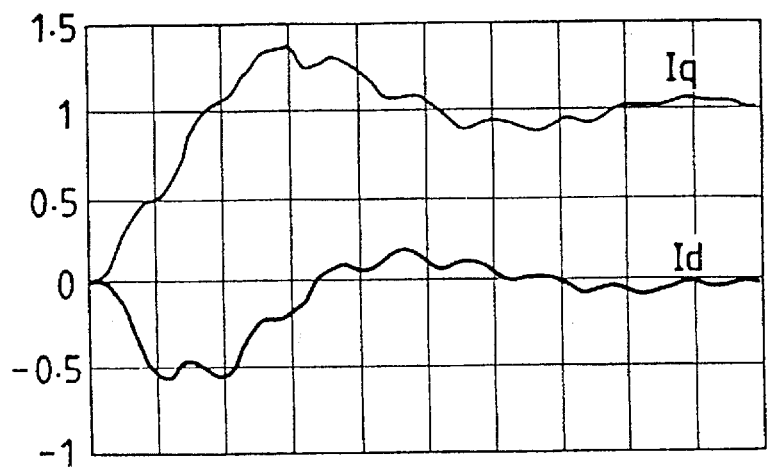
FIG. 12 is a graph showing a step response of the phase q when the compensation of the delay of the current loop is performed at 6,000 rpm.

Hereinafter described are the results of adoption of the control method of the present invention. FIGS. 9, 10 and 11 show step responses of the phase q when the motor is stopped, when the delay of the current loop is not compensated at 4,000 rpm and at 6,000 rpm, respectively. FIG. 12 is a step response of the phase q when the delay of the current loop is compensated at 6,000 rpm. In FIG. 12, the compensation of the delay of current loop is performed by advancing the phase.

In FIGS. 9 and 10, there is not any unstableness of the control system due to the delay of the current loop when the motor is stopped and is in rotation at a low speed (4,000 rpm), but in FIG. 11, the control system becomes unstable due to the delay of the current loop when the motor is in rotation at a high speed (6,000 rpm), causing oscillation of the currents of the phases d and q.

Contrary to the above, according to the control method of the present invention, there is any unstableness of the control system due to the delay of the current loop even when the motor is in rotation at the high speed (6,000 rpm), as shown in FIG. 12.

Figure 13A:
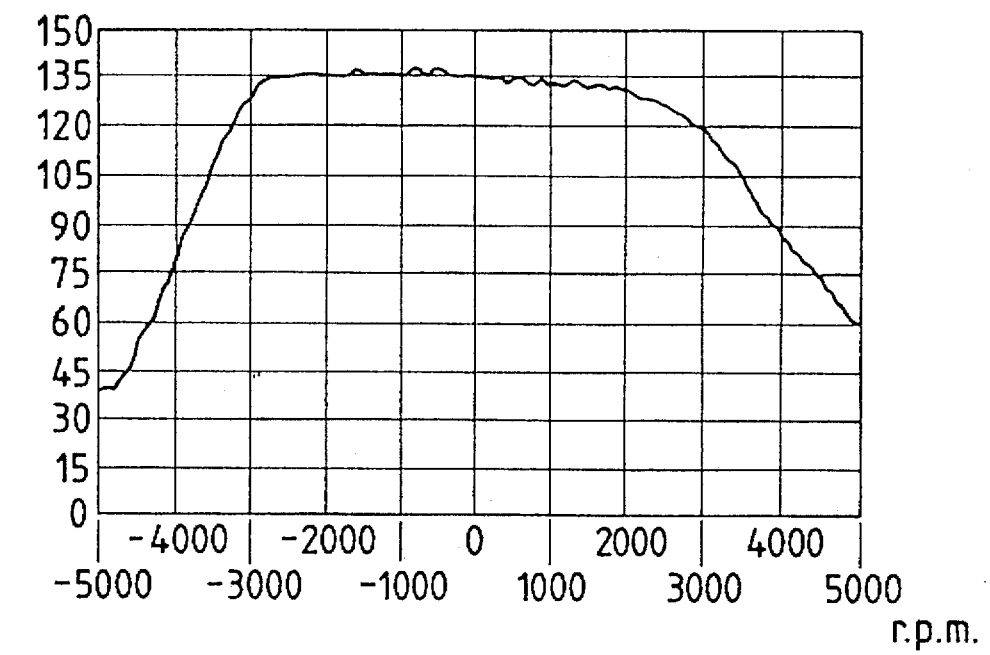
FIGS. 13a and 13b are graphs each showing a torque curve when the phase compensation is not performed.
Figure 13B:
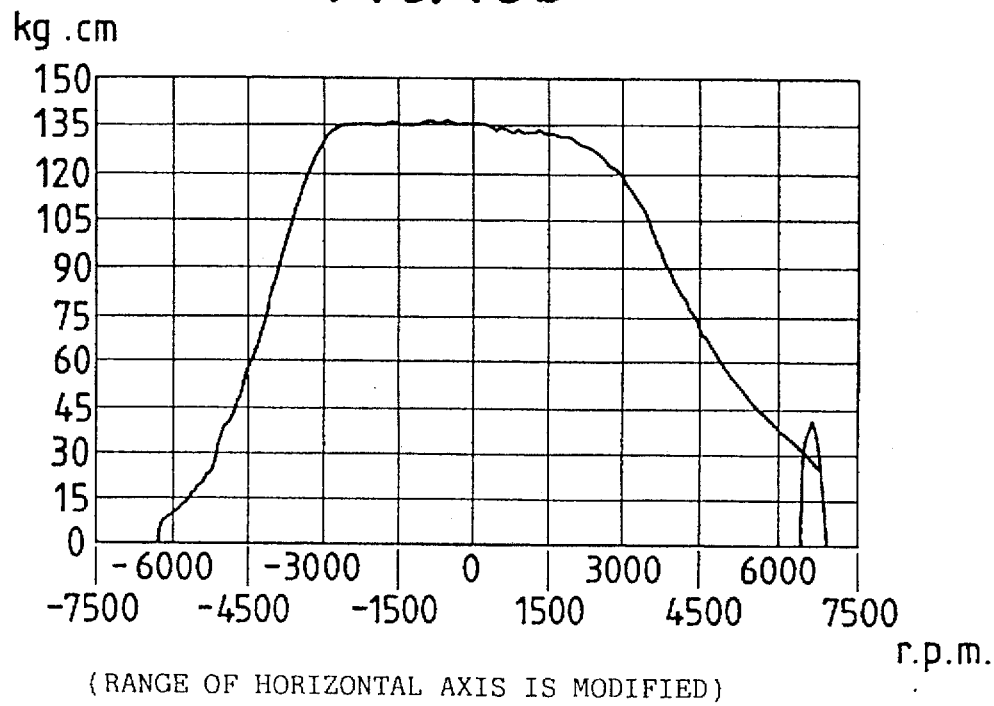
Figure 14:
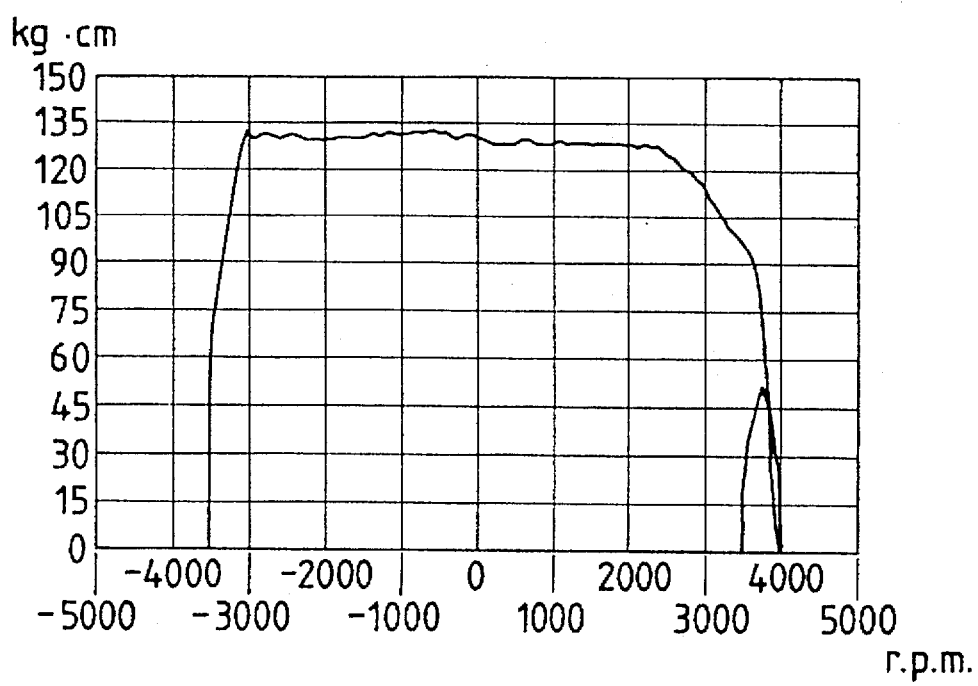
FIG. 14 is a graph showing a torque curve when the control method of the present invention is applied.
Figure 15:
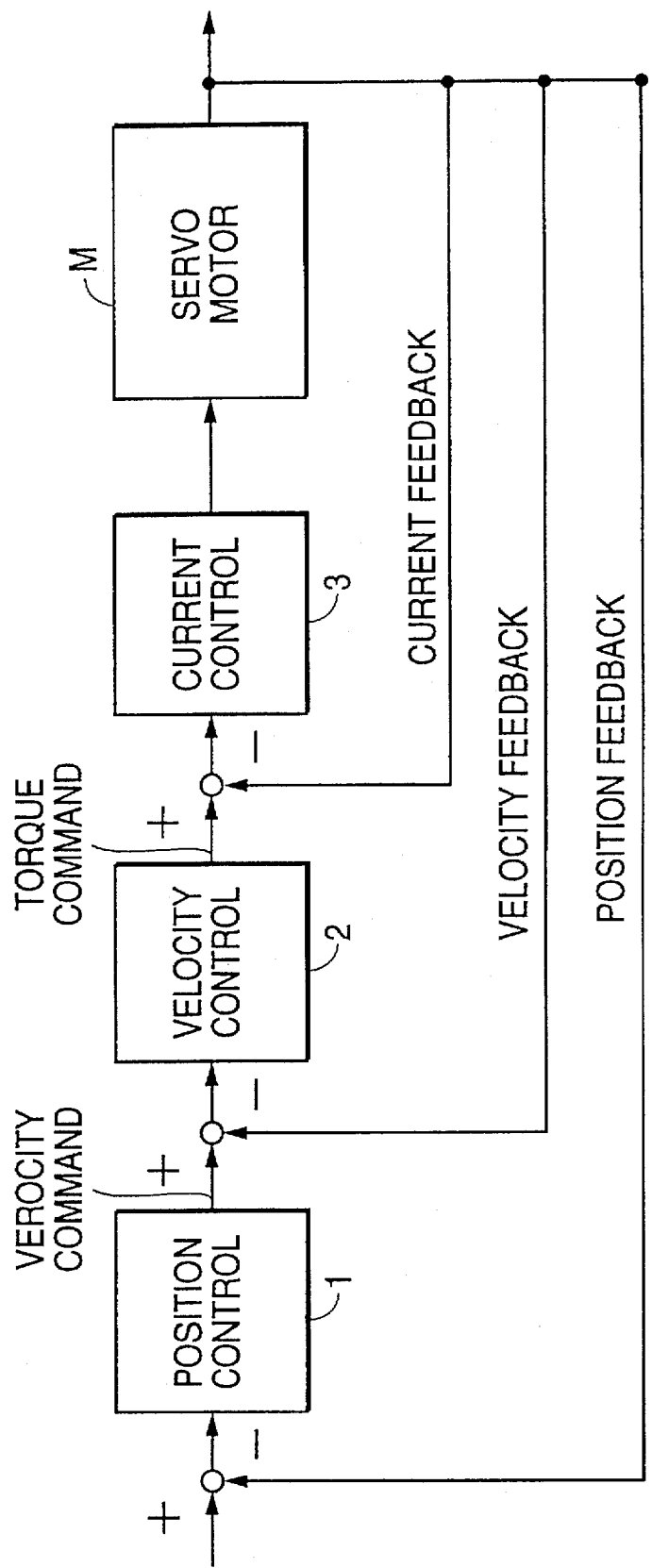
FIG. 15 is a block diagram showing a conventional control system for an AC servo motor.
Figure 16:
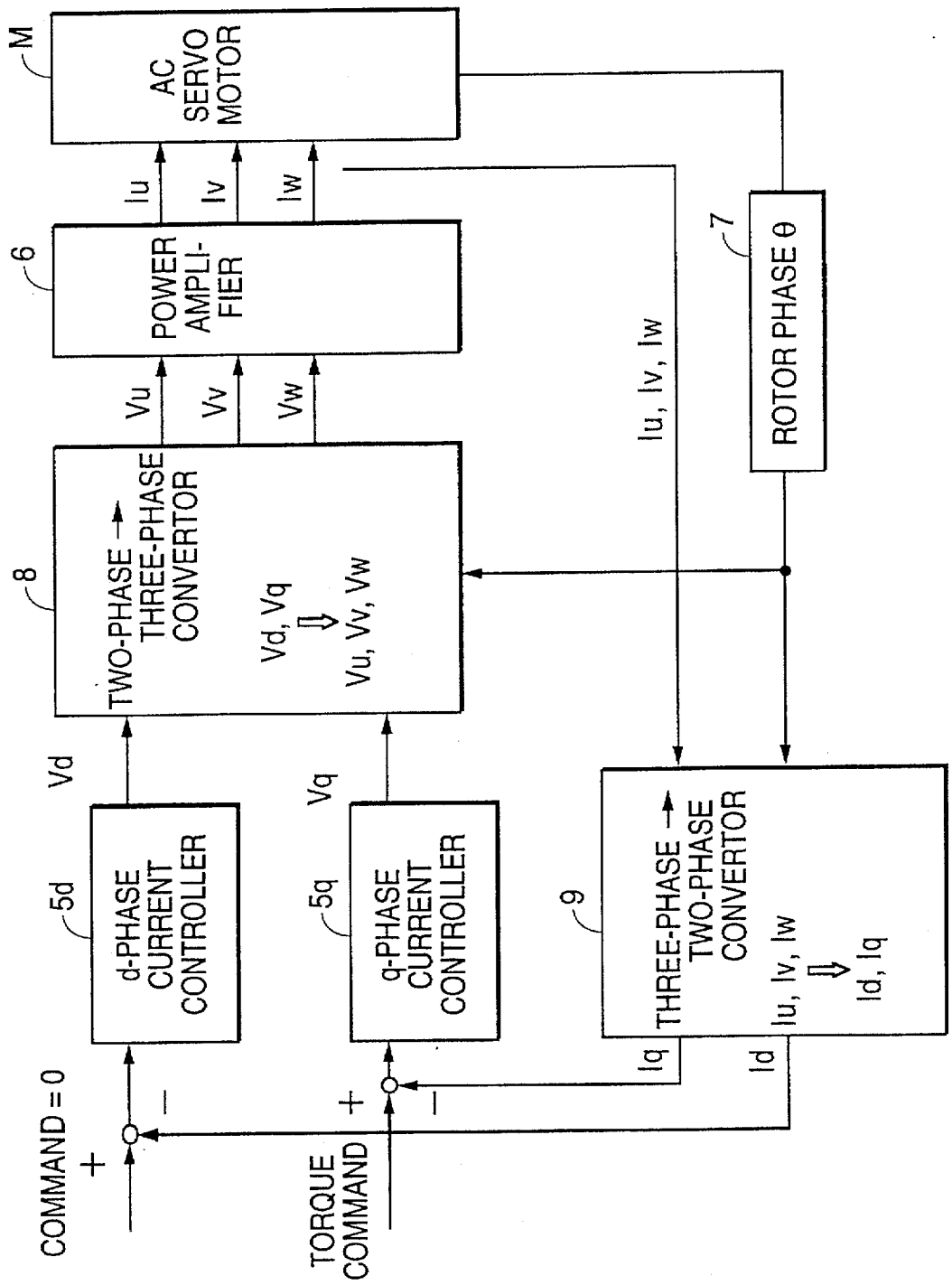
FIG. 16 is a block diagram of a conventional current loop for controlling an AC servo motor using the DQ conversion.
Figure 17:
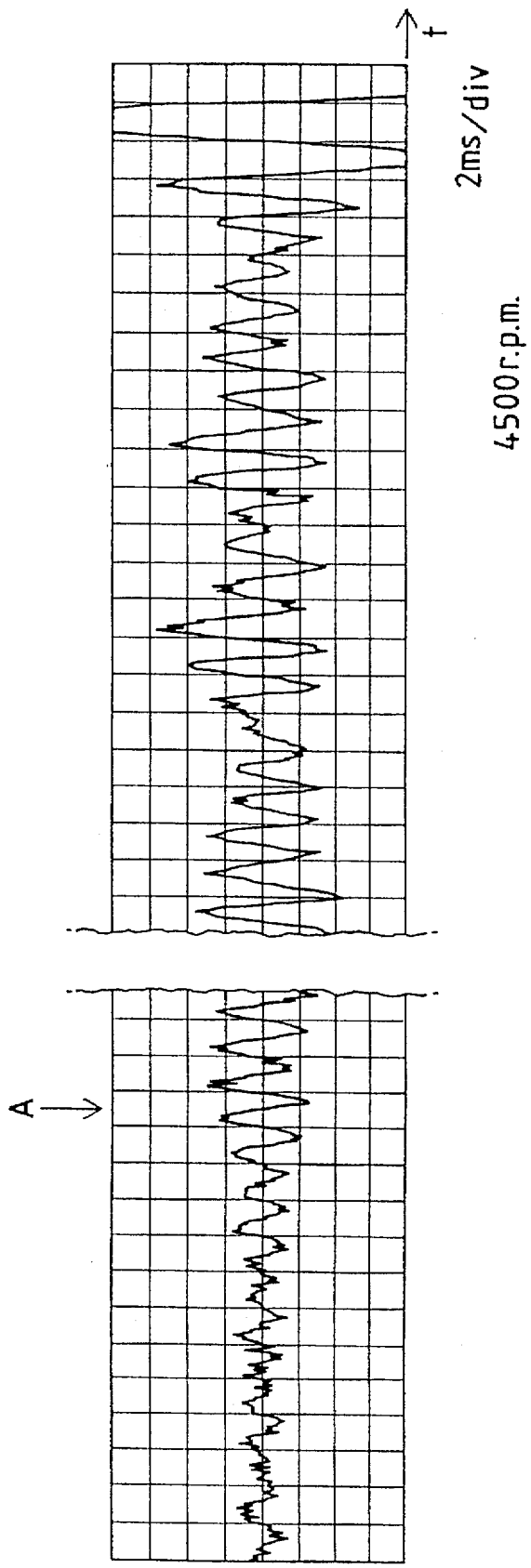
FIG. 17 is a graph showing an oscillation of an actual current in the conventional art.

The torque curves according to the control method of the present invention are shown in FIGS. 13a, 13b and 14. FIG. 14 shows torque values (kgcm) with respect to the rotational speed (rpm) when the compensation of the phase delay is not performed. The characteristic about 4,000 rpm in FIG. 14 indicates an overshoot.

FIGS. 13a and 13b show torque values (kgcm) with respect to the rotational speed (rpm) when the compensation of the phase delay is performed. The horizontal axis of FIG. 13a is identical in range with that of FIG. 14, while the range of the horizontal axis of FIG. 13b is modified to show a high-speed-rotation area.

When comparing FIG. 13a with FIG. 14, a torque of 110 kgcm. is outputted at 3,000 rpm, for example, when the delay is not compensated, but a torque of 120 kgcm is outputted at the same rotational speed when the delay is compensated according to the control method of the present invention.

Further, according to the control method of this invention, the rotational speed at which overshoot occurs is increased from approximately 4,000 rpm up to 7,000 rpm. As described above, according to the present invention, a delay in a current loop can be compensated.

What is claimed is:

1. A method of controlling a current to be supplied to a servo motor having a rotor by performing a DQ conversion for converting a three-phase AC current into a two-phase DC current and a two-phase DC voltage command into a three-phase AC voltage command in a current loop, said method comprising the steps of:

(a) obtaining a phase angle of the rotor;
   (b) obtaining a corrective electrical angle corresponding to a phase delay occurred in the current loop;
   (c) correcting said phase angle obtained in said step (a) based on said corrective electrical angle obtained in said step (b);
   (d) obtaining a command voltage by performing the DQ conversion using said phase angle corrected in said step (c); and
   (e) controlling the current to be supplied to the servo motor based on said command voltage obtained in said step (d).

2. A current controlling method according to claim 1, wherein said step (c) includes a step of correcting said phase angle by subtracting said corrective electrical angle from said phase angle, and said step (d) includes a step of converting a three-phase AC current into a two-phase DC current using said corrected phase angle.

3. A current controlling method according to claim 1, wherein said step (c) includes a step of correcting said phase angle by adding said corrective electrical angle to said phase angle, and said step (d) includes a step of converting a two-phase DC voltage into a three-phase AC voltage using said corrected phase angle.

4. A current controlling method according to claim 1, wherein said step (b) includes a step of obtaining said corrective electrical angle based on the product of a delay time and an electrical angular velocity.

* * * * *